July 9, 1957  M. M. KAHN  2,798,508
FLEXIBLE HOSE AND METHOD OF MAKING SAME
Filed Dec. 8, 1954

*INVENTOR.*
MARVIN M. KAHN
BY *Philip E. Hilbert*
ATTORNEY

United States Patent Office 2,798,508
Patented July 9, 1957

2,798,508

FLEXIBLE HOSE AND METHOD OF MAKING SAME

Marvin M. Kahn, Trenton, N. J., assignor to The Acme-Hamilton Manufacturing Corp., New York, N. Y., a corporation of Delaware Application December 8, 1954, Serial No. 473,789

12 Claims. (Cl. 138—56)

This invention relates to flexible hose and methods of making the same. More particularly, the invention concerns flexible conduits for carrying gases, liquids and light solids, together with methods for making such conduits.

In the production of flexible hose or tubing for many uses, it is important that the inner surface of such conduit be extremely smooth and free of roughness, undulations, discontinuities or the like. Thus, in the case of hose used with vacuum cleaners, optimum air flow and vacuum conditions are attainable only with hose having extremely smooth inner surface portions. However, a major portion of this type of hose now in use, is made in a manner which leaves the inner surface thereof rough and uneven. Such condition is traceable to the conventional reinforcing wire helix, in coated or uncoated form, on the inside exposed wall of the hose. The assembly of the hose components, including the wire helix, gives rise to the indicated rough inner surface.

To avoid irregular inner surfaces in hose constructions, it has been proposed to use seamless tubing as an inner liner for the hose. Obviously, such a construction involves additional material and weight per unit of hose length; more fabricating equipment and substantial increases in manufacturing costs.

Accordingly, one object of this invention is to provide an improved flexible conduit construction including a reinforcing wire helix and thermoplastic tapes which are assembled in a novel manner to produce conduit having a very smooth continuous inner surface, in the absence of any supplemental liners, together with a pleasing, uniformly corrugated outer surface which does not require an auxiliary, ornamental outer covering.

It has been proposed that flexible hose be made of thermoplastic materials such as plasticized polyvinyl chloride and other synthetic resins. However, considerable difficulty has been encountered in properly combining such materials with the usual reinforcing wire structure to obtain a product having a number of desired characteristics including a smooth surfaced inner wall.

Another object of this invention is to provide an improved flexible hose made up of very thin gauge, continuous thermoplastic strips of synthetic resin or the like, and a reinforcing wire helix; such elements being assembled and composited to produce a product of extreme lightness, excellent resistance to mechanical stresses of all sorts and with an extremely smooth inner surface.

A further object of this invention is to provide an improved flexible hose made up of thin gauge, continuous plastic strip and wire reinforcing, together with a thin, flat tieing strip which insures proper assembly and consolidation of the several elements and further provides means for increasing the resistance of the finished product to various mechanical stresses.

Still another object of this invention is to provide an improved flexible hose which includes as components thereof, wide and narrow helically wound continuous thermoplastic strips assembled with a helical wire reinforcement, the strips being of selected color to provide a hose having an outer surface of pleasing appearance embodying contrasting or harmonizing color schemes.

Yet another object of this invention is to provide an improved flexible hose comprising helically wound thermoplastic strips with overlapping edges, and a reinforcing wire helix assembled and consolidated together in a manner to fuse said strips into a unitary mass completely embedding the wire helix, the configuration of the strips and the manner of assembly being variable to produce hose of regulated degrees of flexibility and strength.

Yet a further object of this invention is to provide an improved method of making flexible hose from helically wound continuous thermoplastic strips and reinforcing wire, wherein one of the strips is wound in relation to the wire to provide a determined number of overlapping plies above and below the wire, and another of the strips which is narrower than the first mentioned strip and is substantially inextensible and of high tensile strength, is so disposed in relation to the first mentioned strip and the successive convolutions of the reinforcing wire as to insure proper consolidation of the overlapping strips into a fused body having a uniformly continuous, smooth inner surface and a uniformly corrugated outer surface.

Still a further object of this invention is to provide an improved method of making flexible hose which allows the use of a minimum amount of material per unit length of hose; which may be fabricated with relatively simple equipment and a minimum amount of labor, thereby achieving low production costs, yet providing a hose of minimum unit weight, which is highly resistant to various mechanical stresses, which can meet rigid and exacting industrial specifications applicable to flexible conduit for carrying liquids, gases or light solids; and which has an outer surface of pleasing appearance.

Other objects of this invention will in part be obvious and in part hereinafter pointed out.

Figure 1:
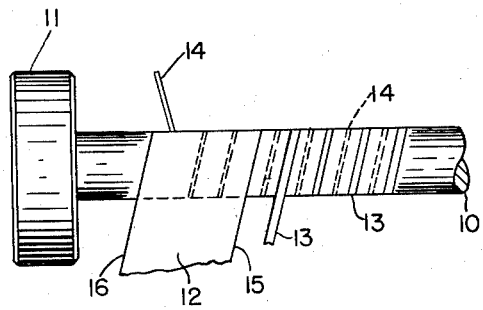
Fig. 1 is a top plan view of the components of the novel hose being supplied to a mandrel for assembling the same.
Figure 2:
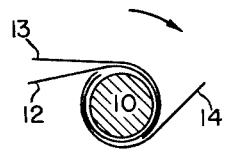
Fig. 2 is a transverse view thereof.

Referring in detail to the drawing and particularly to Figs. 1 and 2, 10 designates a conventional elongated, smooth surfaced cylindrical mandrel of a length proportional to the length of the hose to be made thereon, and extending horizontally from a rotatable head 11, which is rotated by suitable means, not shown, in a manner known in the art.

There is supplied to the rotating mandrel 10, by suitable feeding means, not shown, in a simultaneous manner, the several components of a flexible hose embodying the invention. Such components include a flat thermoplastic tape 12 of continuous length, a continuous length narrow tie member 13 of thermoplastic material which is substantially inextensible and exhibits excellent resistance to mechanical stresses, and a wire 14 for reinforcement.

The tape 12 may be derived from thin gauge thermoplastic synthetic resin sheeting calendared to suitable thickness and slit to desired width. The selected synthetic resin may be a vinyl copolymer, plasticized polyvinyl chloride, polyvinyl alcohol or the like, or, alternatively may be a vulcanizable elastomeric material such as natural or synthetic rubber. The tape 12 may have a thickness as little as .006 inch and a width determined by the ply configuration and wire spacing as hereinafter described.

The tie member 13 is a relatively inextensible, narrow reinforced thermoplastic strip of substantially rectangular cross section which may be formed by coating and embedding unwoven, woven or braided filaments of rayon, or cotton or other fibers. Alternatively, the member 13 may take the form of a thin aluminum or other metal tape coated with thermoplastic resins or the like. Also, the member 13 may comprise a non-reinforced thermoplastic strip made from a synthetic resin or vulcanizable elastomer which has been modified to render the same relatively inextensible, yet flexible and with good tensile strength. The material of tie member 13 shuold be compatible with and capable of fusing with the material of tape 12. The member 13 may be as thin as .018 inch and quite narrow as compared to the width of tape 12. The wire 14 is of the usual type used for reinforcing hose or other flexible conduits and may be of any suitable diameter.

The tape 12, tie member 13 and wire 14 are supplied to mandrel 10 under regulated feed tension, for helical winding thereon with selected overlap relations, as hereinafter described in detail.

Figure 3:
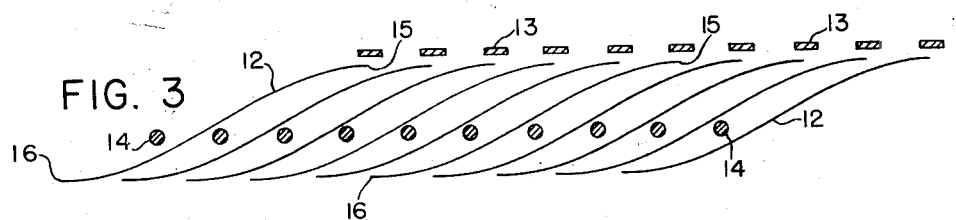
Fig. 3 is a longitudinal schematic view in section of a wall portion of a flexible hose embodying the invention and showing the manner of progression and the relation of the several elements before final consolidation.

Thus, as indicated in Fig. 3, the tape 12 is wound helically with the side edges 15, 16 thereof in overlapping relation while the successive convolutions of wire 14 are interleaved with the convolutions of tape 12 so as to provide three plies of tape over each convolution of wire 14 and two plies of tape under each convolution of wire. It will be noted that this arrangement of tape 12 and wire 14 leaves five plies of tape between successive convolutions of wire; four of the tape plies being continuous and the fifth ply being made up of ply portions at the upper and lower surfaces of the assembly which are in longitudinally offset relation and the side edge 15 of the ply portion on the upper surface being vertically aligned with side edge 16 of the ply portion on the lower surface.

The convolutions of tie member 13 are spaced and located so as to overlap the side edges 15 of the exposed tape portions and to be disposed intermediate successive convolutions of wire 14. Furthermore, the tie member 13 overlaps the joint formed by the vertically aligned side edges 15, 16 of the tape portions at the upper and lower surfaces of the assembly.

It is understood that in actual practice, during the feed of the components 12, 13 and 14 to mandrel 10, the tension on tie member 13 is such as to tightly compress the superposed plies of tape 12 between the convolutions of wire 14 against the surface of mandrel 10 and to thus encase said wire convolutions in the interleaved plies of tape 12.

Upon completing the helical winding of hose components 12, 13 and 14 along the length of mandrel 10, the starting and finishing portions thereof being fixed in place, the mandrel is removed from head 11 and placed in a suitably heated oven, not shown. The temperature of said oven is adjusted in terms of the fusion points of the materials of tape 12 and tie member 13 to effect a plastic flow and substantial fusion of the superposed layers of plastic tape and the integration therewith of tie member 13, as indicated in Fig. 4.

It will be noted that the tape edges 16 are fused into the adjacent tape portions to form a continuous smooth inner surface 17. Due to the intimate contact of the inner surface of the ply assembly with respect to the smooth surface of mandrel 10 during the fusion of the superposed tape layers while compressed by tie member 13, the inner surface 17 of the hose assembly will be devoid of any irregularities, undulations or roughness despite the presence of the wire reinforcement 14 encased in the wall thereof.

Figure 4:
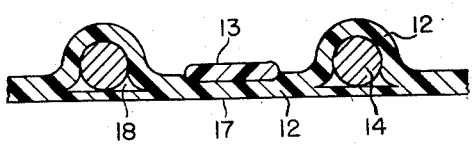
Fig. 4 is a view similar to that of Fig. 3, showing the hose elements in consolidated and homogeneously fused form.

Furthermore, as indicated in Fig. 4, each convolution of wire 14 is encased or embedded in the walled space 18 formed by the integrated layers of tape 12 as conformed about said wire convolutions by tie member 13. It will be apparent that the specific relationship of the wire convolutions 14 and the enclosing tape portions is determined by the width of tie member 13, the tension applied to said tie member during the helical feed thereof and the extent of plastic flow of the material forming the walls defining space 18.

Thus, the wire convolutions may be gripped with varying degrees of friction by the walls of space 18, or may freely float within space 18, thereby providing hose constructions of varying and desired flexibility and regulated resistance to mechanical stresses. However, in all cases, the hose will display an inner surface 17 of glass-like smoothness.

Figure 5:
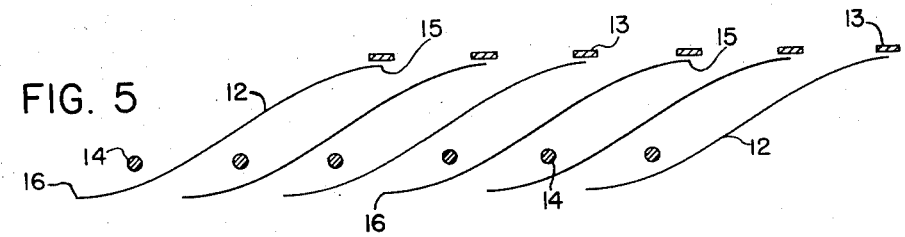
Fig. 5 is a view similar to that of Fig. 3, showing an alternative arrangement of the helically wound tape element in relation to the wire reinforcing.

As shown in Fig. 5, the tape 12 tie member 13 and wire 14 may be helically wound on mandrel 10 to provide an assembly with one ply of tape under, and two plies of tape over, each convolution of wire 14 and leaving three plies of tape between successive wire convolutions. Again the tie member 13 is located in straddling relation to aligned side edges of the tape, as previously described and compresses the superposed tape plies against the mandrel to form, after heating, a structure similar to that shown in Fig. 4. With fewer plies of tape above and below the wire convolutions 14, the thickness of tape 12 may be increased somewhat, if required to provide a desired wall strength and encasing capacity for the wire convolutions.

Figure 6:
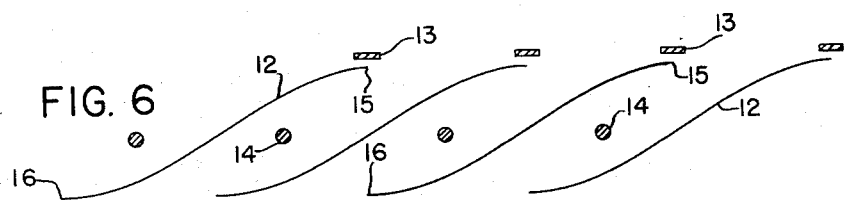
Fig. 6 is also a view similar to that of Fig. 3, showing another alternative arrangement of the tape plies and wire reinforcing.

In Fig. 6 the hose components are helically wound to provide one ply of tape 12 under and above each convolution of wire 14 and leaving two plies of tape between successive wire convolutions. The helically wound tie member 13 is again located so as to straddle the aligned joint as between edges 15 and 16 of tape 12 and compress the tape plies between the wire convolutions as described above.

It will be apparent that by means of the several ply assemblies herein described, as well as other modifications thereof, the total thickness of tape disposed over or under the wire convolutions may be increased or diminished to place a required thickness of material at selected points in accordance with the requirements of specific application of the hose construction.

It is understood that the thermoplastic resins used to form tape 12 and tie member 13 may also include vinylidene chloride, plasticized vinyl copolymers, as well as other resins of a thermoplastic nature. For more severe usage, the flexible hose of the instant invention may be formed of a tape 12 which includes as a reinforcement therefor, unwoven, woven or braided filaments and fibers such as rayon, cotton, nylon or the like, which when associated with a high tensile strength tie member 13 and wire 14, will provide a hose having maximum resistance to mechanical stress, abrasion and the like, yet maintaining its flexibility and a glass smooth inner surface.

Upon providing the tape 12 and tie member 13 in colored forms, varied contrasting or harmonizing color combinations will be apparent on the outer surface of the finished hose, giving the same a pleasing appearance without the need for supplemental outer coverings.

When used as a suction conduit for vacuum cleaners, the hose of the instant invention exhibits a substantial decrease in net weight as compared to conventional hose constructions used for the same purpose. Furthermore, the novel hose readily lends itself to the attachment of the usual soft ends or metal fittings, couplings and the like, at the terminal ends thereof. With the glassy smooth inner surface of the novel hose, optimum air flow conditions are obtainable.

The instant hose construction is also distinguished by relatively shallow corrugations on the outer surface thereof, which makes it easier to manipulate the hose in use, facilitates cleaning and offers a desirable appearance.

Since various changes might be made in the embodiments of the invention herein described and shown without departing from the spirit thereof, it is to be understood that all matter herein shown or described is to be interpreted as illustrative and not in a limiting sense.

Having thus described my invention, I claim as new and desire to protect by Letters Patent:

1. A method of making flexible hose comprising wrapping a thermoplastic tape helically about a cylindrical mandrel, wrapping a reinforcing wire helically and in interleaved relation to said tape, wrapping an inextensible flat thermoplastic tie member helically over said tape and in overlapping relation to the edges thereof while under tension whereby to compress the tape convolutions flatly against the surface of said mandrel between the convolutions of wire, and heating said mandrel and the windings thereon to integrate the tape convolutions and said tie member into a substantially fused tubular body with a wire reinforcement encased in the wall thereof and having an inner surface which is continuously smooth along the axial and circumferential extent thereof.

2. A method of making flexible hose comprising helically feeding to a rotating cylindrical mandrel a thermoplastic tape, a reinforcing wire and a thermoplastic tie member of rectangular cross section and which is narrower than said tape, said wire being located in interleaved relation to the convolutions of said tape, said tie member overlapping the exposed side edges of said tape convolutions and being fed under tension whereby to compress the superposed tape plies against said mandrel between the convolutions of wire, and heating said mandrel and wrappings to integrate the tape plies and said tie member into a coherent tubular body with the wire reinforcement encased in the wall thereof and the inner surface thereof being continuously smooth along the axial extent thereof.

3. The method of forming flexible hose comprising wrapping thermoplastic tape helically about a cylindrical mandrel with the overlapping convolutions thereof axially spaced to locate side edges of the tape convolutions on the outer exposed surface in substantially vertical alignment with side edges of tape convolutions on the inner surface thereof, wrapping a reinforcing wire helically and in interleaved relation to the tape convolutions, helically wrapping an elongated flat thermoplastic tie member which is narrower than said tape under tension and in overlapping relation to the outer exposed side edges of said tape, and heating said mandrel and wrappings thereon to integrate said tape convolutions and tie member into a coherent tubular body having shallow corrugations on the outer surface thereof and a continuously smooth inner surface.

4. The method of forming a flexible hose comprising wrapping thermoplastic tape and reinforcing wire helically about a cylindrical mandrel with the tape convolutions axially spaced to provide at least one ply of tape under the wire convolutions and at least one ply of tape over said wire convolutions and at least two plies of tape between said wire convolutions, wrapping an elongated flat thermoplastic tie member helically and in overlapping relation to the exposed side edges of said tape to uniformly compress the axially extending portions of the superposed tape plies between the wire convolutions against said mandrel, and heating said mandrel and wrappings thereon to fuse the superposed tape plies together and to integrate said tie member therewith.

5. A flexible hose comprising a helically wound thermoplastic tape member with successive convolutions thereof in overlapping relation, a wire reinforcement helically wound and in interleaved relation with said tape convolutions, and a flat thermoplastic tie member narrower than said tape member helically wound between successive turns of said wire reinforcement and in overlapping relation to the upper exposed side edges of said tape convolutions, said tie member radially compressing the portions of said tape convolutions between successive turns of said wire reinforcement, said thermoplastic members being in integrated and fused relation with a continuously smooth inner surface on said hose.

6. A flexible hose comprising helically wound thermoplastic tape with overlapping convolutions, a reinforcing wire helix disposed between overlapping tape convolutions, thermoplastic means on the outer surface of said tape convolutions radially compressing extended axial portions of said tape convolutions between successive convolutions of said wire helix and conforming outer plies of said tape convolutions about said wire reinforcement, said tape convolutions and thermoplastic means being integrated and fused to form a tubular body with shallow corrugations on the outer surface thereof and a continuously smooth inner surface.

7. A flexible hose as in claim 6 wherein said thermoplastic means is of thin flat cross section and said tape is wider than said thermoplastic means.

8. A flexible hose comprising a tubular body including superposed plies of fused thermoplastic material, a reinforcing wire helix embedded in the wall of said body, and a helically wound flat thermoplastic tie member on the outer surface of said body between the convolutions of said helix, the lateral edges of said tie member being disposed inwardly of adjacent turns of said wire reinforcement, and said tie member radially compressing the underlying portions of said superposed plies of material and integrated therewith.

9. A flexible hose comprising a helically wound thermoplastic vinyl tape member with successive convolutions in overlapping relation, an elongated reinforcing member helically wound in interleaved relation to the tape convolutions, and a substantially inextensible vinyl tie member of rectangular cross section helically wound in overlapping relation to the exposed side edges of said tape convolutions and compressing the superposed tape plies between successive convolutions of said reinforcing member while conforming tape plies about successive convolutions of said reinforcing member to provide a tubular body having shallow corrugations on the outer surface thereof and a continuously smooth surface on the inner surface thereof.

10. A flexible hose comprising helically wound tape with successive convolutions thereof in overlapping relation, an elongated flexible reinforcing member helically wound in interleaved relation to the tape convolutions, said tape being of selected width and longitudinal displacement to provide a predetermined number of plies of tape above and below the convolutions of said reinforcing member, and an elongated tie member of rectangular cross section wound helically in overlapping relation to the exposed side edges of said tape convolutions to compress the superposed tape plies between successive convolutions of said reinforcing member, said tie member and the superposed tape plies being integrated together to form a tubular body having a continuously smooth inner surface.

11. A flexible hose comprising a helically wound thermoplastic tape member with overlapping successive convolutions, a reinforcing wire helix disposed between superposed portions of said tape member, said tape member being of determined width and longitudinal displacement to provide a predetermined number of tape plies above and below the wire convolutions, the leading edge of tape convolutions exposed on the outer surface thereof being in substantially vertical alignment with the trailing edge of tape convolutions exposed on the inner surface thereof, and a flat thermoplastic tie member in overlapping relation to the helically disposed aligned edges of said tape convolutions, said tie member being located between successive convolutions of said wire helix to form a tubular body with said tie member integrated with the convolutions of said tape member, said body having a continuously smooth inner surface.

12. A method of forming a flexible hose comprising helically wrapping a thermoplastic tape and a reinforcing wire about a cylindrical mandrel with the convolutions of said tape in overlapping relation and the convolutions of said wire being interleaved between superposed portions of said tape convolutions, helically wrapping and tensioning a flat thermoplastic tie member of a predetermined width less than that of said tape, in overlapping relation to the exposed edges of said tape convolutions on the outer surface thereof to compress said tape convolutions between successive convolutions of said wire against said mandrel, regulating the tension on said tie member to vary the conformation of the outer plies of said tape about the circumferential extent of said wire convolutions, and heating said mandrel and the thermoplastic wrappings thereon to integrate and substantially fuse the superposed tape plies and the tie member into a tubular body having a continuously smooth inner surface and a uniformly corrugated outer surface of pleasing appearance.

References Cited in the file of this patent

UNITED STATES PATENTS

| | | |
|---|---|---|
| 2,321,064 | Broedling | June 8, 1943 |
| 2,475,389 | Hersey | July 5, 1949 |
| 2,641,303 | Vance | June 9, 1953 |